United States Patent [19]

Luccarelli, Jr. et al.

[11] Patent Number: 4,499,114

[45] Date of Patent: Feb. 12, 1985

[54] FLAVORING SOME TROPICAL FLAVORED FOODSTUFFS WITH MIXTURE OF $C_4$–$C_{10}$-N-ALKANOIC ACID AND ETHYL ESTER OF 2-HYDROXY-4-METHYL PENTANOIC ACID

[75] Inventors: Domenick Luccarelli, Jr., Neptune; Braja D. Mookherjee, Holmdel; Richard A. Wilson, Westfield; Michael J. Zampino, North Bergen; David R. Bowen, Somerset, all of N.J.

[73] Assignee: International Flavors & Fragrances Inc., New York, N.Y.

[21] Appl. No.: 620,164

[22] Filed: Jun. 13, 1984

[51] Int. Cl.$^3$ ............................................. A23L 1/235
[52] U.S. Cl. .................................... 426/534; 560/179
[58] Field of Search ........................................ 426/534

[56] References Cited

PUBLICATIONS

Hirvi et al., The Aroma of Blueberries, *J. Sci. Food Agric.*, 1983, 34, 992–998.
Arctander, Perfume and Flavor Chemicals, vols. I–II, 1969, Publ. by the Author–Montclair, N.J., Monograph Nos. 549, 840, 1596, 2400.

*Primary Examiner*—Joseph Golian
*Attorney, Agent, or Firm*—Arthur L. Liberman

[57] ABSTRACT

Described is a method for augmenting or enhancing the aroma or taste of "tropical" flavored foodstuffs comprising, adding to said foodstuff, a mixture of:
(a) at least one $C_4$–$C_{10}$ n-alkanoic acid; and
(b) the ethyl ester of 2-hydroxy-4-methyl-pentanoic acid.

8 Claims, 11 Drawing Figures

FIG. 1 NMR SPECTRUM FOR EXAMPLE I(B).

GLC PROFILE FOR TRAP I OF EXAMPLE IV.

GC-MS PROFILE FOR FRACTION I OF EXAMPLE IV.

FLAVORING SOME TROPICAL FLAVORED FOODSTUFFS WITH MIXTURE OF $C_4$–$C_{10}$-N-ALKANOIC ACID AND ETHYL ESTER OF 2-HYDROXY-4-METHYL PENTANOIC ACID

BACKGROUND OF THE INVENTION

The instant invention relates to mixtures of:
(a) alkanoic acids defined according to the generic structure:

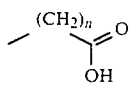

(wherein n represents an even integer of 2, 4, 6 or 8);

and
(b) the ethyl ester of 2-hydroxy-4-methyl-pentanoic acid defined according to the structure:

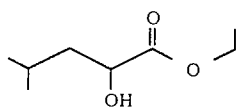

and uses thereof in augmenting or enhancing the aroma or taste of tropical flavored foodstuffs.

The compound defined according to the structure:

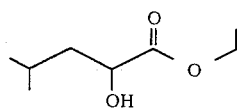

is known to exist in the neutral volatile constitutents in grape brandies as disclosed by Schreier, et al, J. Agric. Food Chem., Vol. 27, No. 2, 1979, page 365 (specifically at page 368, Table II).

An adjacent methyl homologue thereof, the compound having the structure:

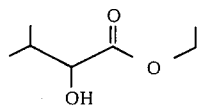

exists in blueberry aroma as disclosed by Hirvi, et al, J. Sci. Food Agric., 1983, 34 (9), 992–6, the same blueberry aromas also contain the acids, acetic acid, butanoic acid, 2-methyl butanoic acid, pentanoic acid and hexanoic acid as set forth on page 994 of Hirvi, et al, cited supra.

Taken alone, the compound having the structure:

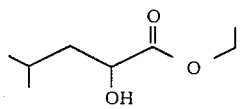

has a blueberry and valerian oil aroma and taste characteristic causing it to be useful alone at levels of from about 1 up to about 100 ppm in blueberry, tropical fruit, caju, lime and valerian oil flavors.

There has been considerable work performed relating to substances which can be used to impart (modify, augment or enhance) flavors to (or in various foodstuffs and beverages. These substances are used to diminish the use of natural products some of which may be in short supply and to provide more uniform properties in the finished product.

Ripe, natural notes for tropical fruit flavors, including guava, mango and papaya are particularly desirable and are particularly sought after. Natural papaya has, to many tastes, an aesthetically pleasing flavor only during a very short time of its ripening period. The same holds true for mango and guava. Accordingly, foodstuffs created using mango, guava and papaya are primarily bland in flavor unless the flavors are augmented or enhanced with some other material. Heretofore, no such materials which contribute natural ripe tropical fruit flavors are known to give an aesthetically pleasing effect to said tropical fruit flavors. Alone, the compound defined according to the structure:

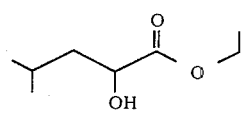

is inadequate for creation of the above effect. Alone, $C_4$–$C_{10}$ carboxylic acids are inadequate for the creation of the above effect.

The combination of the compound having the structure:

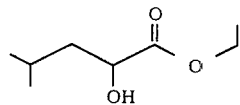

and at least one of the compounds defined according to the structure:

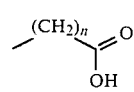

unexpectedly causes creation of the above effect; that is a contribution of natural ripe tropical fruit flavors which gives an aesthetically pleasing effect to tropical fruit flavored foodstuffs.

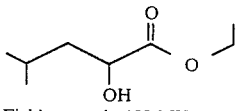

(Conditions: Field strength: 100 MHz; solvent: $CFCl_3$).

Figure 2:
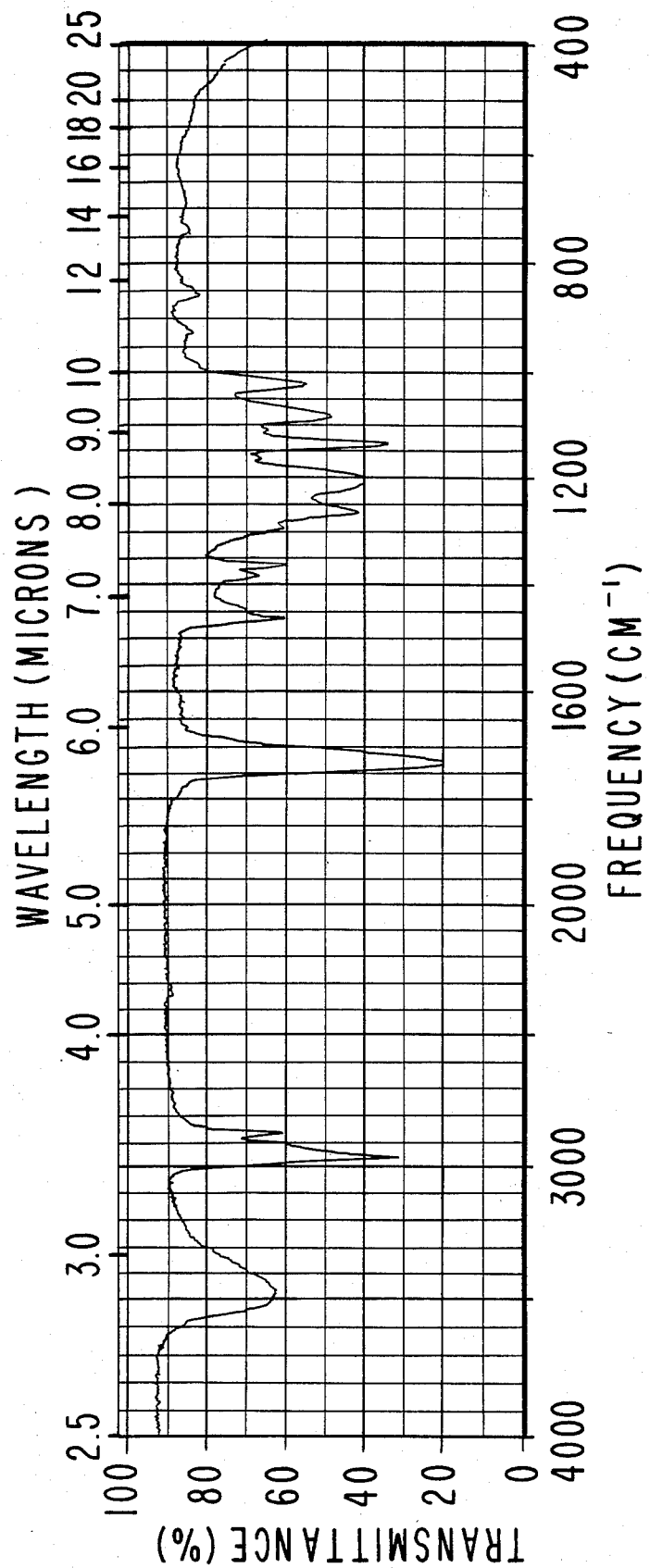

FIG. 2 is the infra-red spectrum for the compound having the structure:

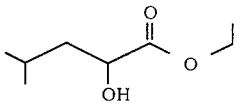

resulting from the distillation of the reaction product of Example I.

Figure 3:
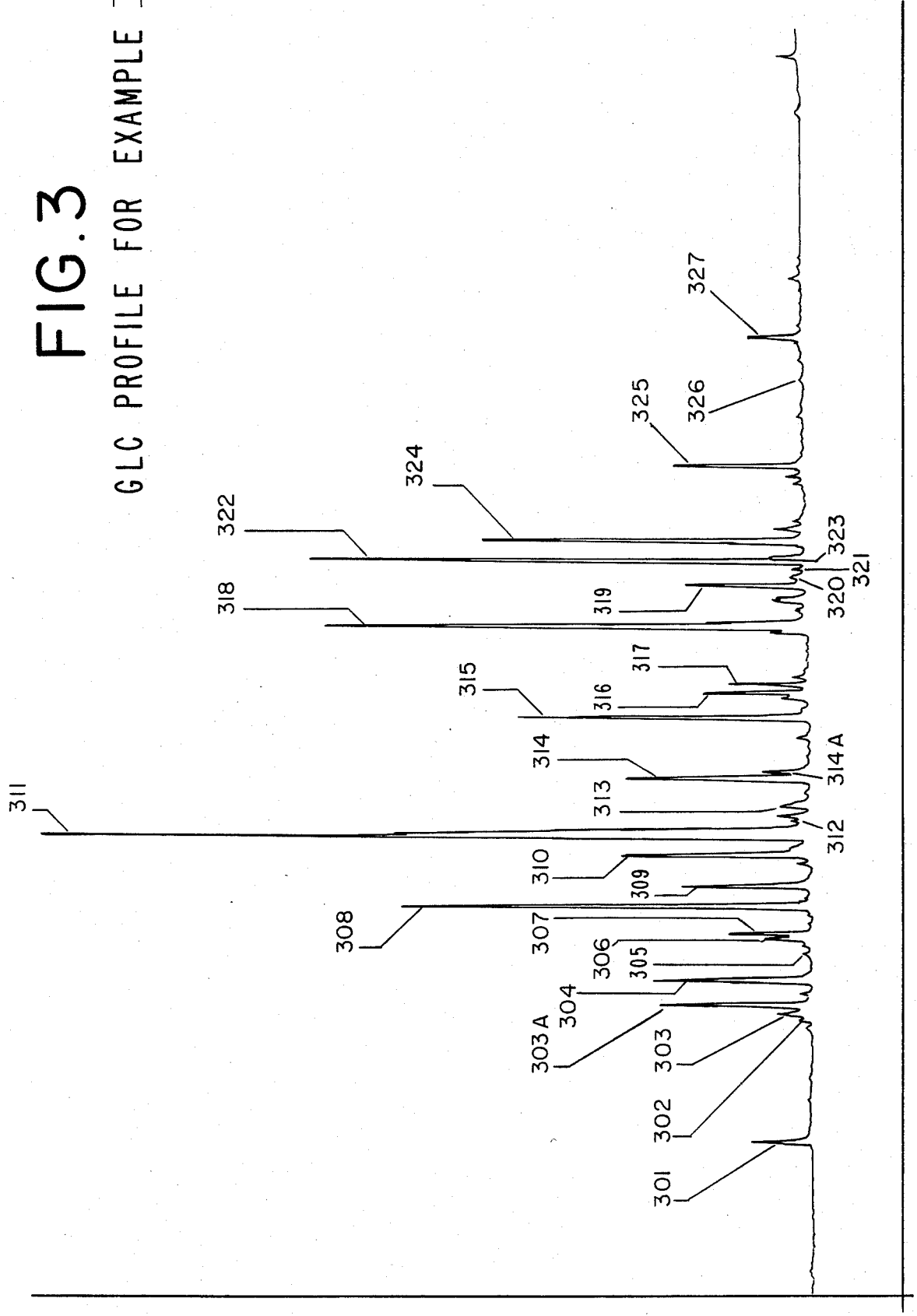

FIG. 3 is the GLC profile of the head space of caju essence (see Example IV, infra).

Figure 4:
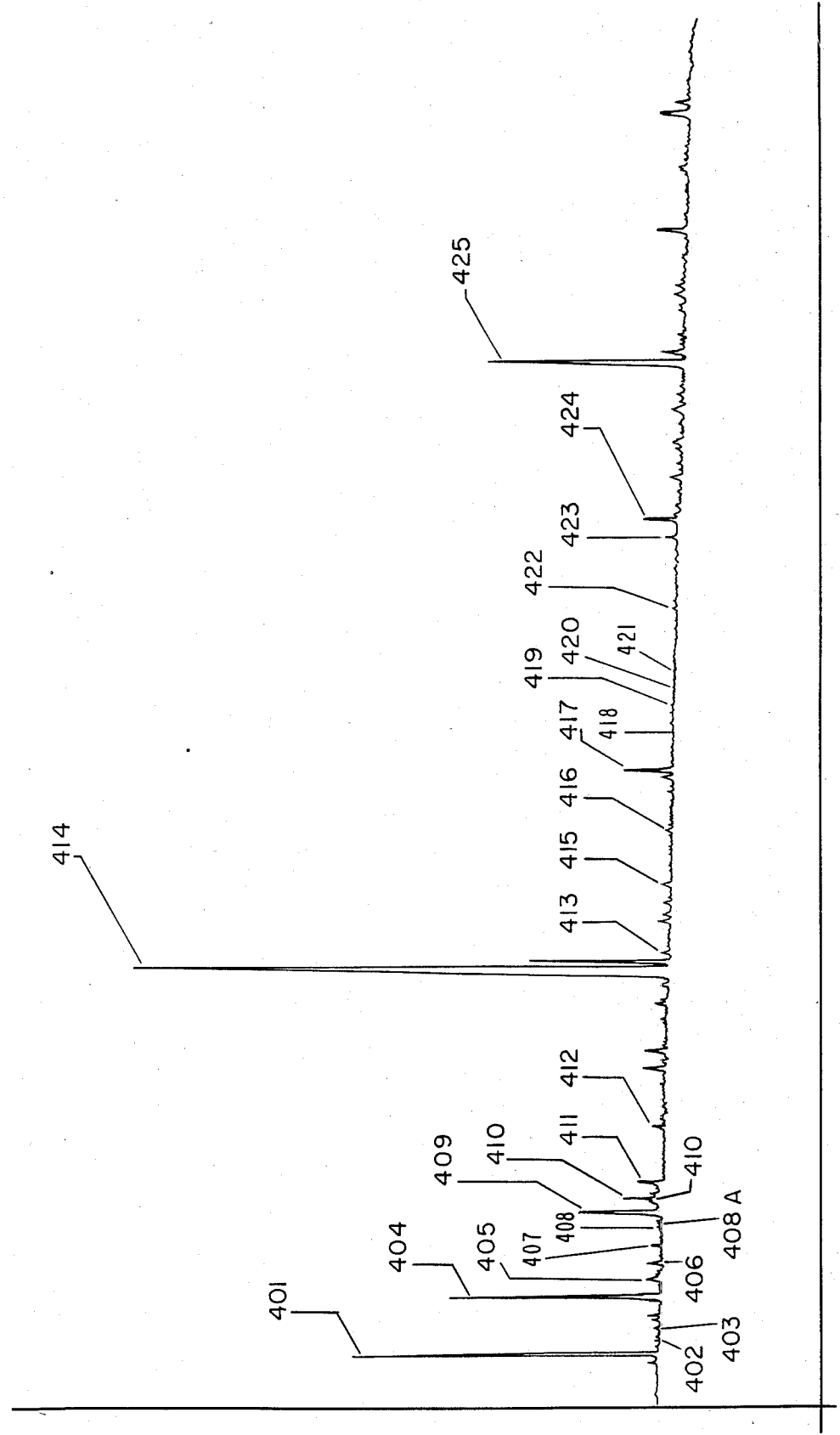
Figure 11:
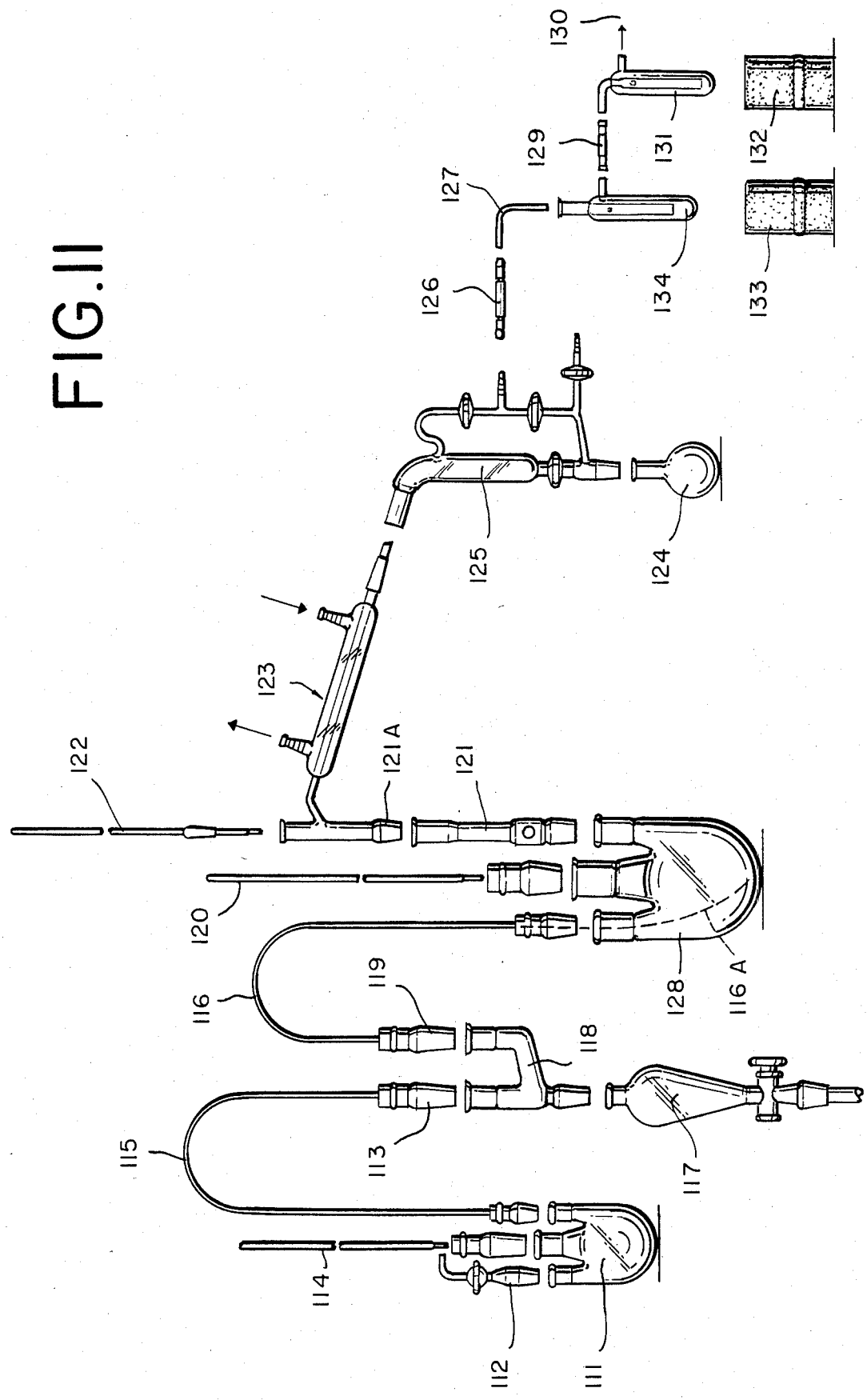

FIG. 4 is the GLC profile for fraction 1 of the caju steam distillation of Example IV, collected in receiver 124 of FIG. 11.

Figure 5:
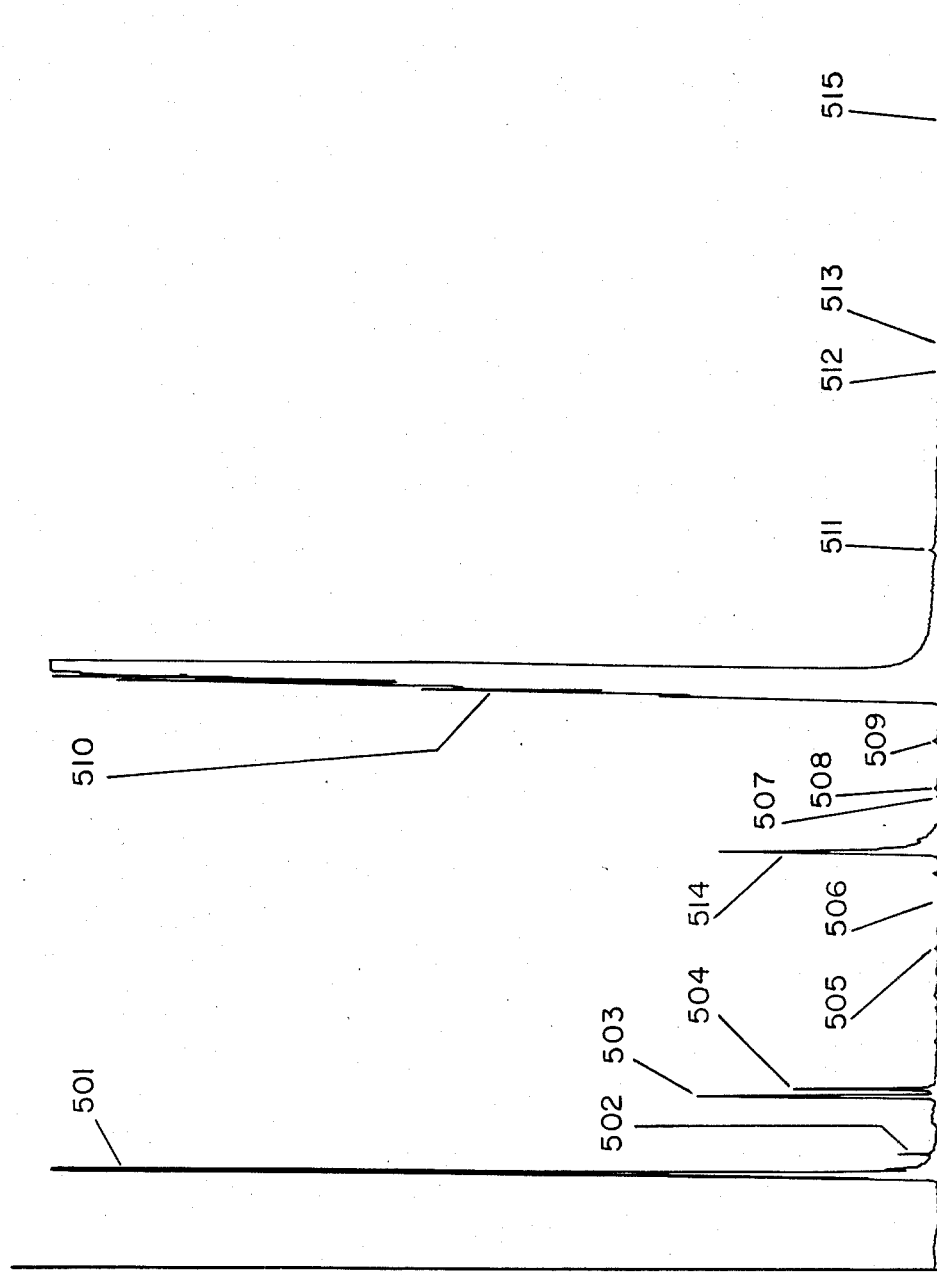

FIG. 5 is the GLC profile for fraction 3 of the caju vacuum steam distillation of Example IV, collected in receiver 124 as shown in FIG. 11.

Figure 6:
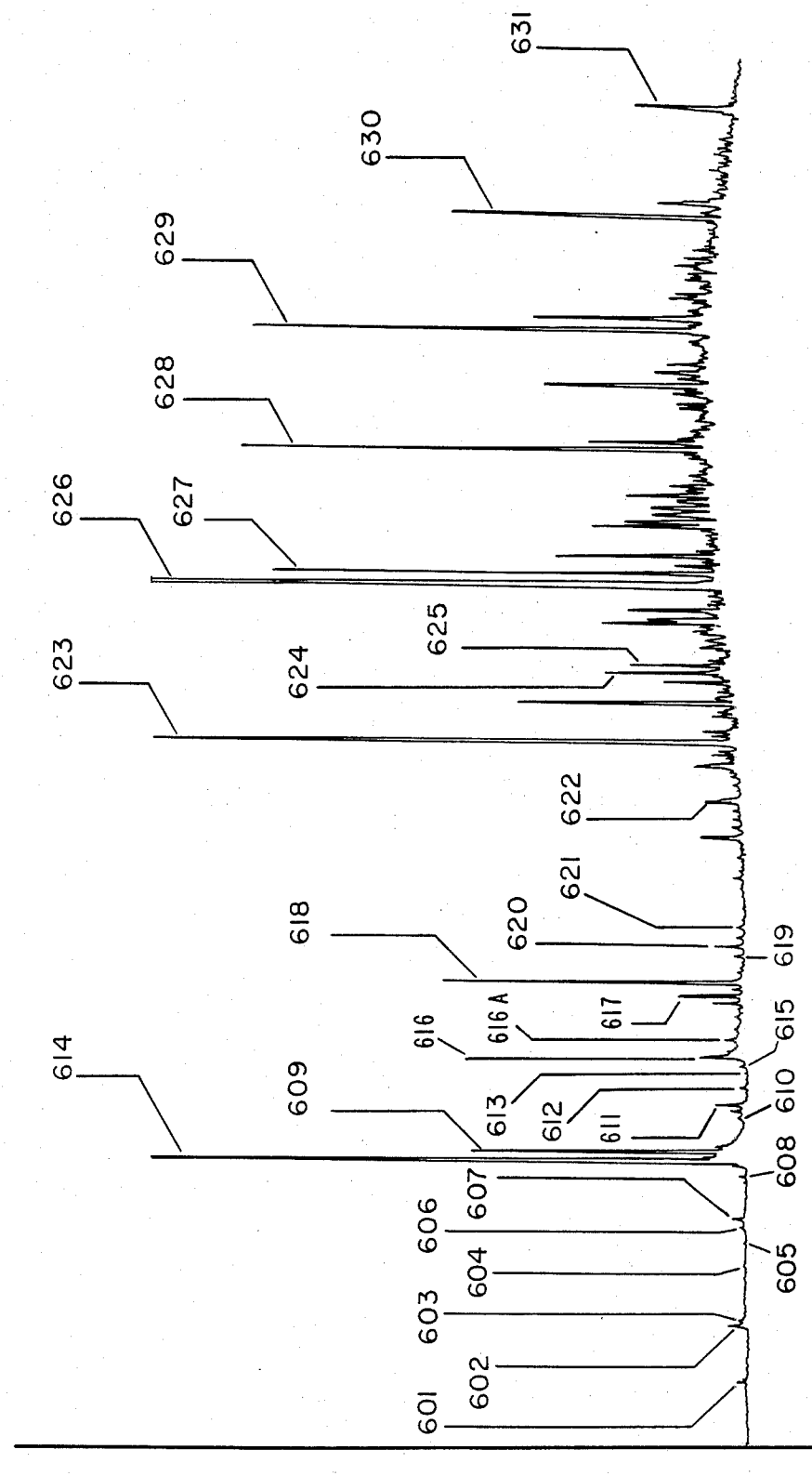

FIG. 6 is the GLC profile of the material recovered in the isopropyl alcohol-dry ice trap 134 in FIG. 11 during the caju vacuum steam distillation of Example IV.

Figure 7:
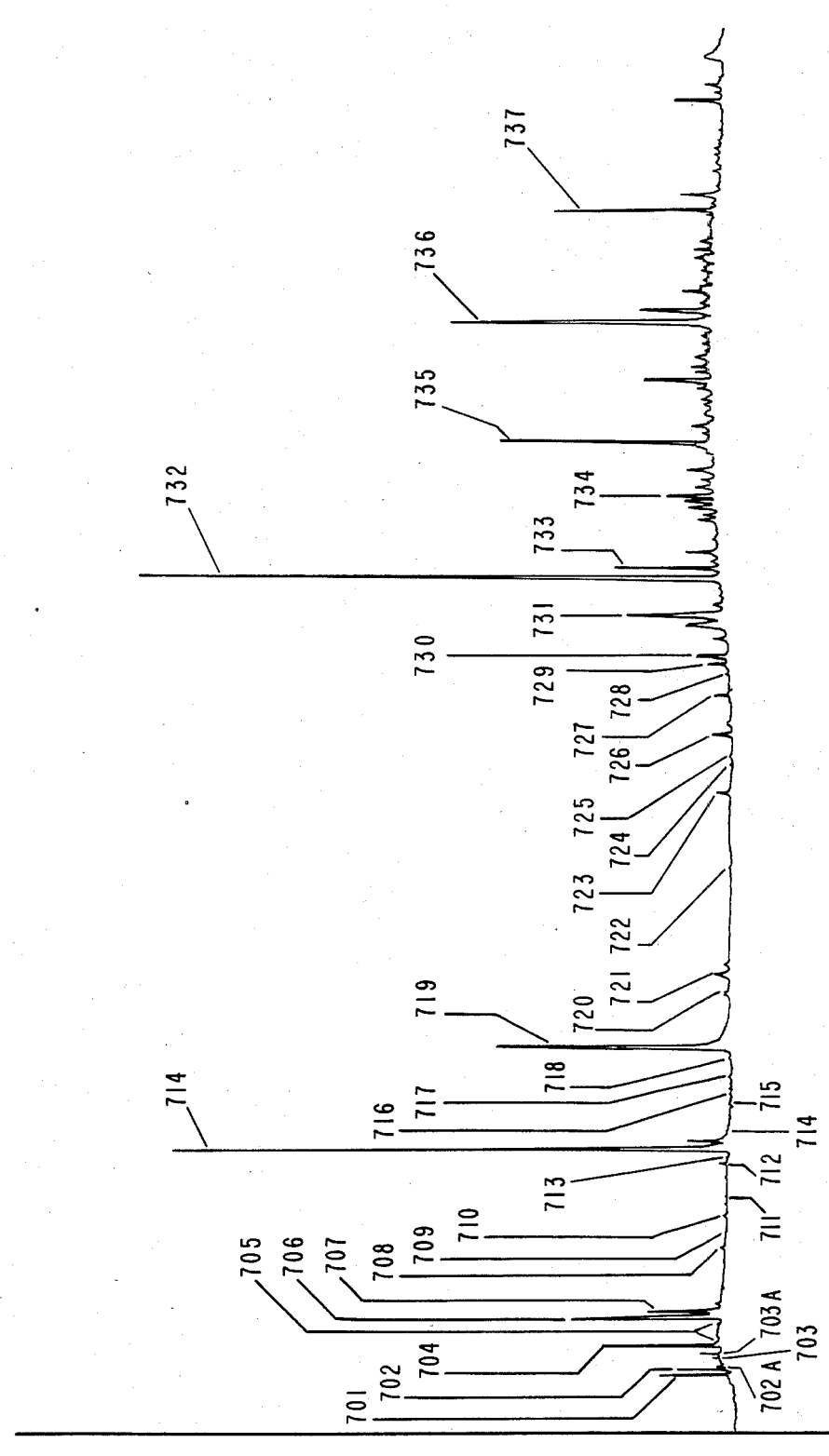

FIG. 7 is the GLC profile of the material recovered in trap 131 (cooled with an isopropanol-dry ice mixture) during the caju vacuum steam distillation of Example IV.

Figure 8:
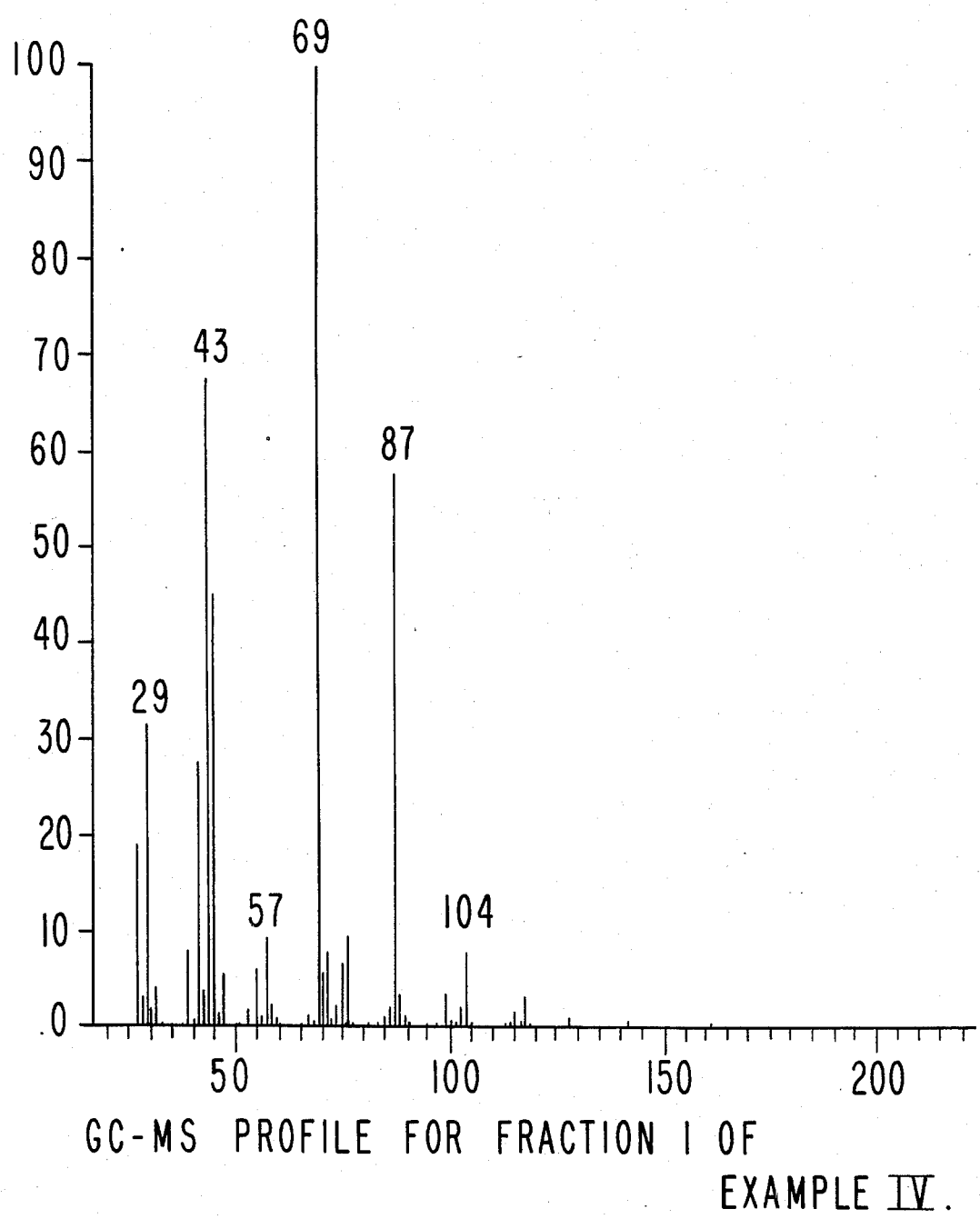

FIG. 8 is the GC-MS profile of fraction 1 of the caju vacuum steam distillation of Example IV recovered from receiver 124 shown in FIG. 11.

Figure 9:
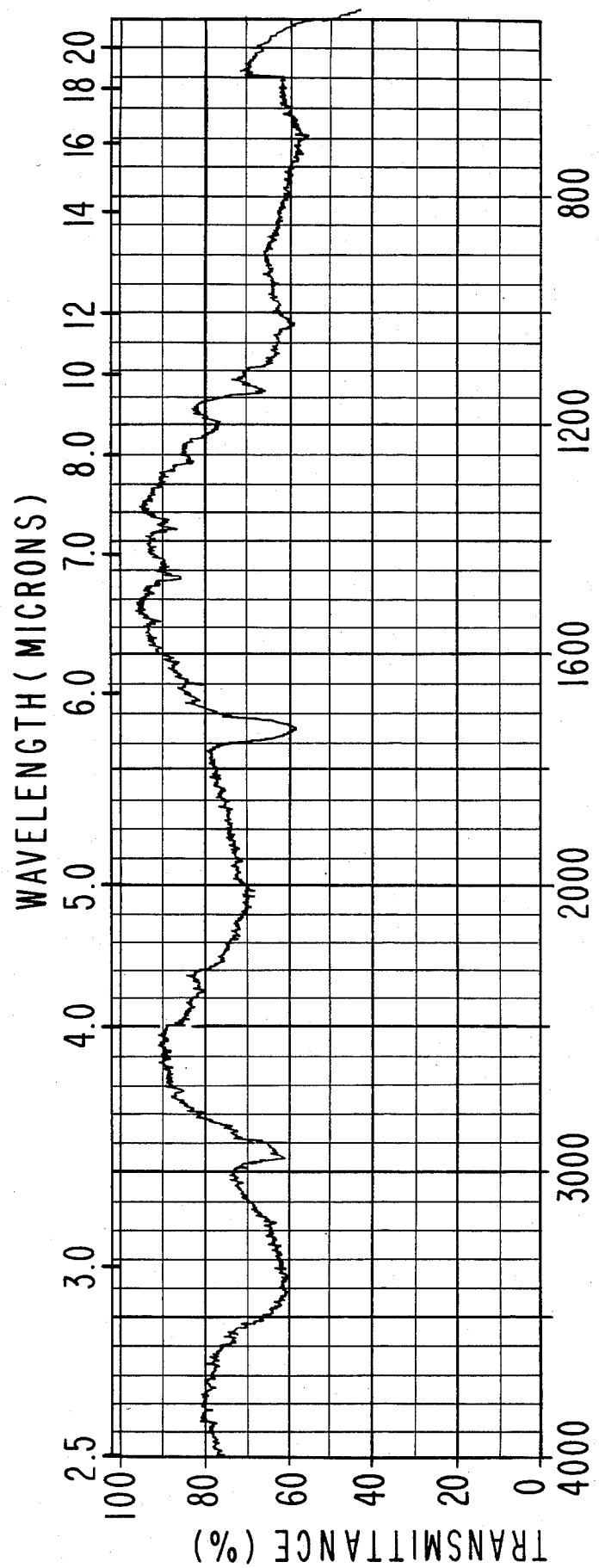

FIG. 9 is the infra-red spectrum for the peak indicated by reference numeral 414 on FIG. 4 obtained from fraction 1 of the caju vacuum steam distillation of Example IV, recovered in receiver 124 shown in FIG. 11. The compound of the peak indicated by reference numeral 414 in FIG. 4 has the structure:

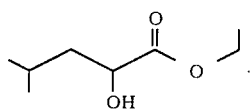

Figure 10:
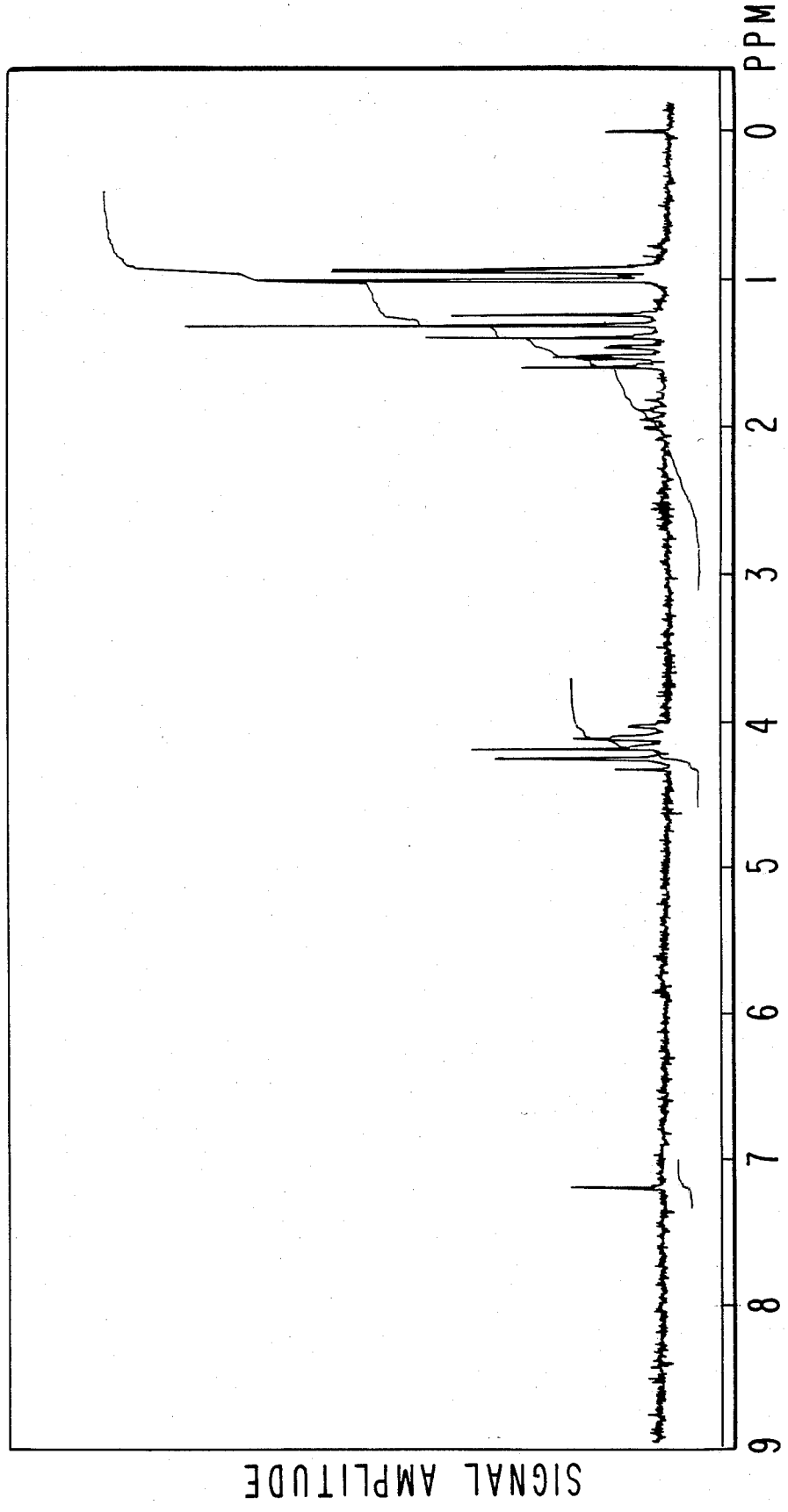

FIG. 10 is the NMR spectrum for the compound having the structure:

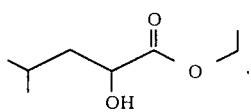

which is peak 414 of the GLC profile of FIG. 4 for fraction 1 of the caju vacuum steam distillation of Example IV recovered in receiver 124 shown in FIG. 11.

FIG. 11 is a diagram of the apparatus used in obtaining the fractions and traps for the caju vacuum steam distillation of Example IV.

THE INVENTION

Our invention relates to mixtures of:

(a) at least one carboxylic acid defined according to the structure:

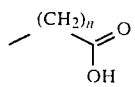

(wherein n represents an even integer of 2, 4, 6 or 8);

and (b) the synthetically produced, substantially pure ethyl ester of 2-hydroxy-4-methyl-pentanoic acid defined according to the structure:

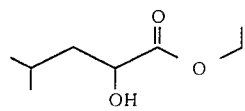

wherein the weight ratio of carboxylic acid:ethyl ester of 2-hydroxy-4-methyl-pentanoic acid is from about 1:8 up to about 1:2.

Our invention also relates to a process for augmenting or enhancing the aroma or taste of tropical flavored foodstuffs including guava flavored foodstuffs, papaya flavored foodstuffs, mango flavored foodstuffs and caju flavored foodstuffs. The use of the mixtures of our invention in the flavors for these foodstuffs may range from about 0.75% up to about 1.2% by weight of the flavor.

The mixtures of our invention as defined above, add to caju juice flavor, mango flavor, guava flavor and papaya flavor a very natural-like, ripe, tropical fruit taste and aroma nuances causing the most aesthetically pleasing flavor and aroma nuances to be captured in such tropical fruit flavors even when the natural tropical fruit flavors themselves are obtained from tropical fruits that do not have these natural-like ripe nuances (which is the case most of the time).

The compound having the structure:

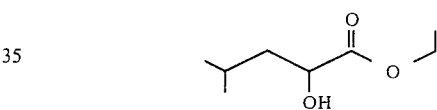

is synthesized by first reacting isovaleraldehyde with 2-hydroxy-2-cyano propane in order to form 1-hydroxy-1-cyano-3-methyl butane according to the reaction:

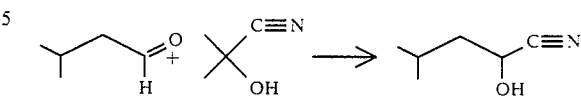

and then reacting the 1-hydroxy-1-cyano-3-methyl butane with hydrogen chloride and absolute ethanol according to the reaction:

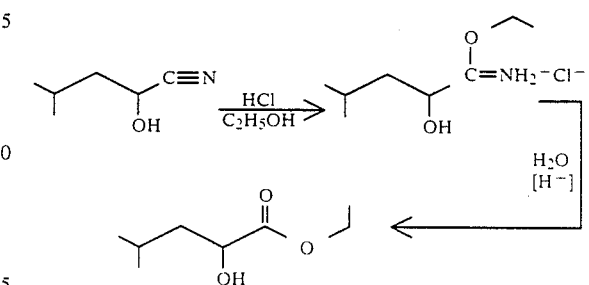

as exemplified in Example I, infra.

The compound having the structure:

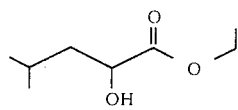

is intended herein to include racemic mixtures of the stereoisomers having the structures:

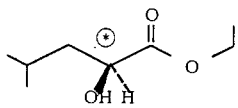

and

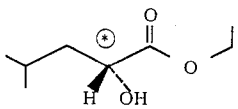

as well as the individual stereoisomers thereof having the structures:

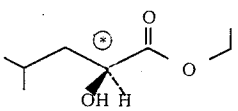

and

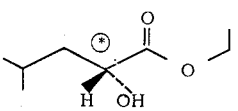

wherein the carbon atom having an (*) adjacent thereto is the assymetric carbon atom. Individual stereoisomers having the structures:

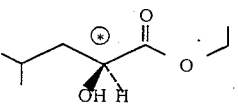

and

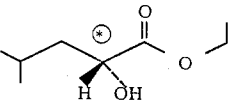

can be obtained from the racemic mixture of the compound having the structure:

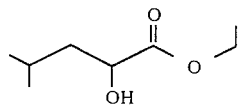

by reacting the members of the racemic mixture with a pure d-lactic acid whereby a dd and dl lactic acid:ester mixture is formed of the compounds having the structures:

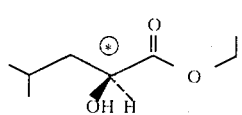

and

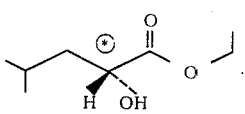

The mixture of the dd and dl esters of lactic acid of the compounds having the structures:

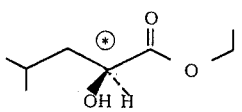

and

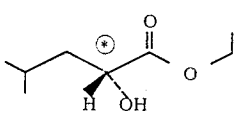

is then separated by means of fractional crystalization. The resulting dd and dl esters, now separated, are then hydrolyzed by standard hydrolysis means thereby producing the pure dextro and pure laevo compound having the structures:

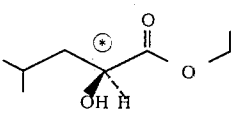

and

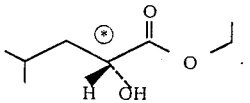

Individual mixtures containing the compound having the structure:

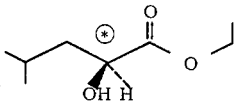

and at least one of the compounds defined according to the structure (wherein n is an even integer of 2, 4, 6 or 8):

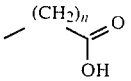

or the compound having the structure:

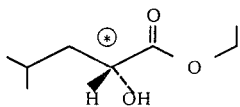

and at least one of the compounds having the structure:

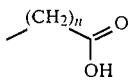

are also contemplated within the scope of our invention.

Examples of mixtures of the ethyl ester of 2-hydroxy-4-methyl pentanoic acid and the $C_4$–$C_{10}$ carboxylic acids of our invention are as follows:

| INGREDIENTS | PARTS BY WEIGHT |
| --- | --- |
| (i) ethyl ester of 2-hydroxy-4-methyl pentanoic acid | 7.50 |
| n-butyric acid | 2.00 |
| (ii) ethyl ester of 2-hydroxy 4-methyl pentanoic acid | 7.50 |
| caproic acid (n-hexanoic acid) | 1.50 |
| (iii) ethyl ester of 2-hydroxy-4-methyl pentanoic acid | 7.50 |
| capric acid (n-decanoic acid) | 1.00 |
| (iv) ethyl ester of 2-hydroxy 4-methyl pentanoic acid | 7.50 |
| caprylic acid (n-octanoic acid) | 1.25 |

The mixtures of carboxylic acid as defined according to the structure:

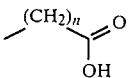

and the ethyl ester of 2-hydroxy-4-methyl pentanoic acid defined according to the structure:

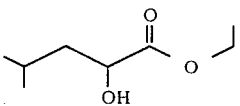

are hereinafter referred to as "ester:acid mixtures".

When the ester:acid mixtures of our invention are used as foodstuff flavor adjuvants, the nature of the co-ingredients included with said ester:acid mixtures in formulating the product composition also serves to alter, modify or enhance the organoleptic characteristics of the ultimate foodstuff treated therewith. As used herein, in regard to flavors, the terms "alter", "modify" and "augment" in their various forms mean "supplying or imparting flavor character or note to otherwise bland, relatively tasteless substances or augmenting the existing flavor characteristics where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks, and the like.

The term "chewable gum" is intended to mean a composition which comprises substantially water-insoluble, chewable plastic gum base such as chicle, or substitutes thereof, including jelutong, guttakay rubber or certain comestible natural or synthetic resins or waxes. Incorporated with the gum base in admixture therewith may be plasticizers or softening agents, e.g., glycerine, and a flavoring composition which incorporates one or more of the ester:acid mixtures of our invention, and in addition, sweetening agents which may be sugars, including sucrose or dextrose and/or artificial sweeteners such as cyclamates or saccharin. Other optional ingredients may also be present.

Substances suitable for use herein as co-ingredients or flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may in general be characterized as flavoring adjuvants or vehicles comprising, broadly, stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2- and 3-tertiary-butyl-4-hydroxy anisole) butylated hydroxytoluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose; natural and synthetic gum such as gum arabic, gum tragacanth; gelatin, proteinaceous materials; lipids, carbohydrates; starches, pectins, and emulsifiers, e.g., mono- and diglycerides of fatty acids, skim milk powder, hexoses, pentoses, disaccharides, e.g., sucrose, corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like, firming agents such as aluminum sodium sulfate, calcium chloride and calcium gluconate; texturizers, anti-caking agents, e.g., aluminum calcium sulfate and tri-basic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include other organic acids, e.g., acetic acid, formic acid, 2-hexenoic acid, benzoic acid, cinnamic acid, isobutyric acid, isovaleric acid, alpha-methylbutyric acid, propionic acid, valeric acid, 2-methyl-2-pentenoic acid and 2-methyl-3-pentanoic acid; ketones and aldehydes, e.g., acetaldehyde, acetophenone, acetone, acetyl methyl carbinol, acrolein, n-butanal, crotonal, diacetyl, 2-methylbutanal, beta,-beta-dimethyl acrolein, methyl n-amyl ketone, n-hexanal, 2-hexenal, isopentanal, hydrocinnamic aldehyde, 2-heptenal, nonyl aldehyde, 4-(p-hydroxyphenyl)-2-butanone, alpha-ionone, beta-ionone, 2-methyl-3-butanone, benzaldehyde, beta-damascone, alpha-damascone, beta-damascenone, acetophenone, 2-heptanone, o-hydroxy-acetophenone, 2-methyl-2-hepten-6-one, 2-octanone, 2-undecanone, 3-phenyl-4-pentenal, 2-phenyl-2-hexenal, 2-phenyl-2-pentenal, furfural, 5-methyl-furfural, cinnamaldehyde, beta-homocyclocitral, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpinhydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl carpylate, ethyl cinnamate, ethyl crotonate, ethyl formate, ethyl isobutyrate, ethyl isovalerate, ethyl laurate, ethyl myristate, ethyl alpha-methyl-butyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate, and terpenyl acetate; hydrocarbons such as dimethyl naphthalene, dodecane, methyldiphenyl, methyl naphthalene, myrcene, naphthalene, octadecane, tetradecane, tetramethylnaphthalene, tridecane, trimethylnaphthalene, undecane, caryophyllene, alpha-phellandrene, beta-phellandrene, p-cymene,1-alpha-pinene beta-pinene, dihydrocarveol; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2-5-dimethylpyrazine, 5-isoamyl-2,3-dimethylpyrazine, 2-isoamyl-3,5,6-trimethylpyrazine, isopropyl dimethypyrazine, methyl ethylpyrazine, tetramethylpyrazine, trimethylpyrazine; essential oils such as jasmine absolute, cassia oil, cinnamon bark oil; black pepper oleoresin, oil of black pepper, rose absolute, orris absolute, oil of cubeb, oil of coriander, oil of pimento leaf, oil of patchouli, oil of nutmeg, lemon essential oil, safran oil, Bulgarian rose, capsicum, yara yara and vanilla; lactones such as gamma-nonalactone; sulfides, e.g., methyl sulfide and other materials such as maltol, and acetals (e.g., 1,1-diethoxyethane, 1,1-dimethyloxyethane and dimethoxymethane), piperine, chavicine, and piperidine.

The specific flavoring adjuvant selected for use may be either solid or liquid depending upon the desired physical form of the ultimate product, i.e., foodstuff, whether simulated or natural, and should, in any event, (i) be organoleptically compatible with the ester:acid mixtures of our invention by not covering or spoiling the organoleptic properties (aroma and/or taste) thereof; (ii) be non-reactive with the ester:acid mixtures of our invention and (iii) be capable of providing an environment in which the ester:acid mixtures can be dispersed or admixed to provide a homogeneous medium. In addition, selection of one or more flavoring adjuvants, as well as the quantities thereof will depend upon the precise organoleptic character desired in the finished product. Thus, in the case of flavoring composition, ingredient selection will vary in accordance with the foodstuff, chewing gum, medicinal product or toothpaste to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of ester:acid mixtures employed in a particular instance can vary over a relatively wide range, depending upon the desired organoleptic effects to be achieved. Thus, correspondingly, greater amounts would be necessary in those instances wherein the ultimate food composition to be flavored (e.g., with a grape flavor or an oral hygiene-type flavor) is relatively bland to the taste, whereas relatively minor quantities may suffice for purposes of enhancing the composition merely deficient in natural flavor or aroma. The primary requirement is that the amount selected be effective, e.g., sufficient to alter, modify or enhance the organoleptic characteristics of the parent composition, whether foodstuff per se, chewing gum per se, medicinal product per se, toothpaste per se, or flavoring composition.

The use of insufficient quantities of one or more ester-:acid mixtures of our invention will, of course, substantially vitiate any possibility of obtaining the desired results while excess quantities prove needlessly costly and in extreme cases may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of ester:acid mixtures ranging from a small but effective amount, e.g., 0.05 parts per million up to about 500 parts per million based on total composition, are suitable. Concentrations in excess of the maximum quantity stated are not normally recommended since they fail to provide commensurate enhancement of organoleptic properties. In those instances wherein the ester:acid mixtures are added to the foodstuff as an integral component of a flavoring composition, it is, of course, essential that the total quantity of flavoring composition employed be sufficient to yield an effective ester:acid mixtures concentration in the foodstuff product.

Food flavoring compositions prepared in accordance with the present invention, preferably contain, as stated, supra, the ester:acid mixtures in concentrations ranging from 0.75% up to 1.2% by weight based on the total weight of said flavoring composition.

The compositions described herein can be prepared according to conventional techniques well known as typified by cake batters and fruit drinks and can be formulated by merely admixing the involved ingredients within the proportion stated in a suitable blender to obtain the desired consistency, homogeneity of dispersion, etc. Alternatively, flavoring compositions in the form of particulate solids can be conveniently prepared by mixing the ester:acid mixtures with, for example, gum arabic, gum tragacanth, carrageenan and the like, and, thereafter, spray-drying the resultant mixture whereby to obtain the particular solid product. Preprepared flavor mixes in powder form, e.g., a fruit-flavored mix, are obtained by mixing the dried solid components, e.g., starch, sugar and the like, and ester:acid mixtures in a dry blender until the requisite degree of uniformity is achieved.

It is preferred to combine with the ester:acid mixtures of our invention the following adjuvants:
Nor-methyl jasmonate (described in U.S. Pat. No. 4,294,863 issued on Oct. 13, 1981)
Dihydro-nor-methyl jasmonate (described in U.S. Pat. No. 4,294,863 issued on Oct. 13, 1981)
2-methyl-4-n-propyl-1,3-oxathiane
2-methyl-6-n-propyl-1,3-oxathiane
Guava extract
Mango extract
Vanillin
Phenyl acetaldehyde
Benzyl acetate
Maltol
Benzyl alcohol
Ethyl-3-methyl-3-phenyl-glycidate
Heliotropin
Furfural
Ocimene
Linalool
Cis-allocimene
Trans-allocimene
Myrcene
Gamma-hexalactone
Gamma-heptalactone.

It will thus be apparent that the ester:acid mixtures of our invention can be utilized to alter, modify, augment or enhance sensory properties particularly organoleptic properties such as flavors in a wide variety of consumable materials including foodstuffs and beverages.

The following Examples serve to illustrate our invention and this invention is to be considered restricted thereto only as indicated in the appended claims.

All parts and percentages give herein are by weight unless otherwise specified.

EXAMPLE I(A)

Formation of 1-hydroxy-1-cyano-3-methyl butane

Reaction

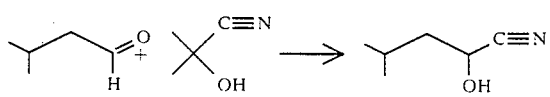

Into a 500 ml reaction flask equipped with Dean Stark Trap, condenser, heating mantle, pot thermometer and magnetic stirrer is placed 86 grams (2 moles) of isovaleraldehyde. With stirring, 2 grams of triethylamine are added while maintaining the reaction mass at 25°–27° C. While maintaining the reaction mass at 25°–27° C., 85 grams (2 moles) of acetone cyanohydrin is added to the reaction mass. The reaction mass is then heated to 56° C. and maintained at 56° C. with stirring for a period of 2.5 hours. The reaction mass is then heated to reflux (86° C.) causing the acetone (product of reaction) to be removed from the reaction product. When approximately 70 ml acetone is collected, GLC analysis on a methyl silicone (OV-1) column indicates negligible isovaleraldehyde remains in the reaction mix. Therefore, the reaction mass is cooled to room temperature.

The reaction product is used for the reaction as set forth in Example I(B).

EXAMPLE I(B)

Preparation of ethyl ester of 2-hydroxy-4-methyl-pentanoic acid

Reaction

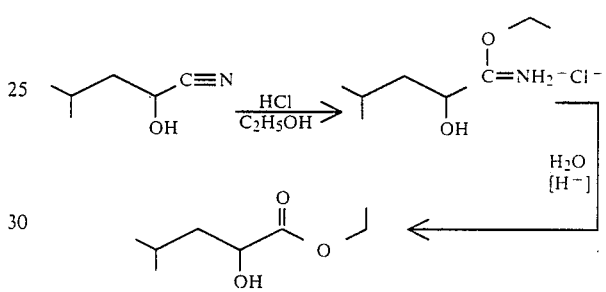

Into a 2 liter reaction flask equipped with gas dispersion tube, pot thermometer, dry ice/isopropyl alcohol cooling bath and condenser connected to bubbler is placed the 1-cyano-1-hydroxy-3-methyl butane prepared according to Example I(A).

To the reaction mass 1 liter of absolute ethanol is added.

The cyano hydrin product is cooled to 0° C. with stirring and gaseous hydrogen chloride is bubbled in at a steady rate. After approximately 10 minutes of addition of hydrogen chloride gas, the reaction temperature rises to 70° C. and hydrogen chloride gas addition is stopped.

The reaction mass is then poured into an equal volume of water and the resulting aqueous phase is extracted with three 500 ml portions of methylene dichloride. The resulting extracts are combined and washed with two portions of aqueous 5% sodium bicarbonate. This is followed by two portions of aqueous saturated sodium chloride solution.

The resulting extract is dried over anhydrous magnesium sulfate and concentrated by means of rotary evaporation.

The crude reaction mass weighs 206.4 grams (65% yield based on isovaleraldehyde reactant).

The resulting product is then distilled at a vapor temperature of 55° C. and vacuum of 4.9 mm/Hg.

The resulting product has the structure:

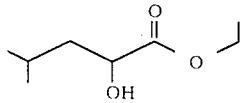

as confirmed by NMR and IR analysis.

Figure 1:
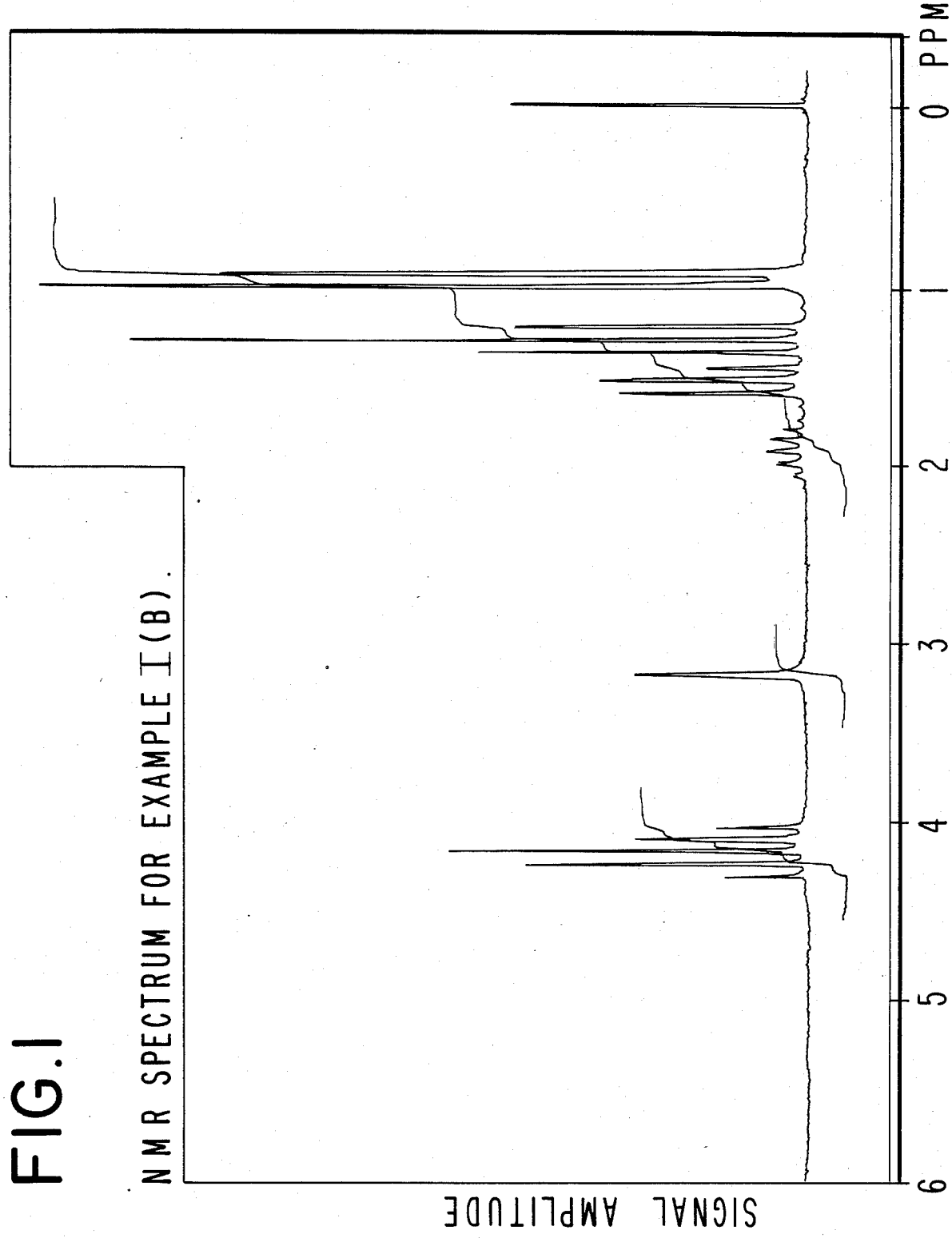
FIG. 1 is the NMR spectrum for the distillation product of the reaction product of Example I containing the compound having the structure.

FIG. 1 is the NMR spectrum for the compound having the structure:

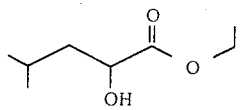

as prepared above (Conditions: Field strength: 100 MHz; solvent: CFCl$_3$).

FIG. 2 is the infra-red spectrum for the compound having the structure:

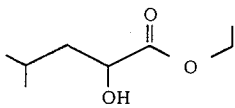

prepared according to this Example.

EXAMPLE II

The following four mixtures are prepared:

| INGREDIENTS | PARTS BY WEIGHT |
| --- | --- |
| Mixture A | |
| Ethyl ester of 2-hydroxy-4-methyl-pentanoic acid prepared according to Example I(B) | 7.50 |
| n-butyric acid | 2.00 |
| Mixture B | |
| Ethyl ester of 2-hydroxy-4-methyl-pentanoic acid | 7.50 |
| n-hexanoic acid | 1.50 |
| Mixture C | |
| Ethyl ester of 2-hydroxy-4-methyl-pentanoic acid | 7.50 |
| Capric acid (n-decanoic acid) | 1.00 |
| Mixture D | |
| Ethyl ester of 2-hydroxy-4-methyl-pentanoic acid | 7.50 |
| n-octanoic acid | 1.25 |

Each of mixtures A, B, C and D is added separately at the rate of 2 ppm and at the rate of 8 ppm to the following substances:
(i) GOYA ® Products Mango Nectar (manufactured by the Goya Foods Inc., Secaucus, N.J. 07094);
(ii) GOYA ® Guava Nectar (manufactured by the Goya Foods Inc., Secaucus, N.J. 07094);
(iii) GOYA ® Guava Paste (manufactured by the Goya Food Inc., Secaucus, N.J. 07094); and
(iv) GOYA ® Products Papaya Nectar (manufactured by the Goya Food Inc., Secaucus, N.J. 07094).

The addition of mixtures A, B, C and D at the levels indicated to the food products indicated imparts to these food products a much more natural, ripe, tropical fruit flavor. When only the compound having the structure:

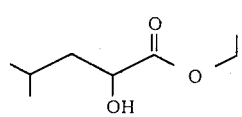

is added without the use of the carboxylic acids, the resultant products remain somewhat bland and do not have the intense, ripe aesthetically pleasing character, which is created as a result of the use of the *mixture* of carboxylic acids defined according to the structure:

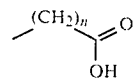

and the ethyl ester of 2-hydroxy-4-methyl-pentanoic acid defined according to the structure:

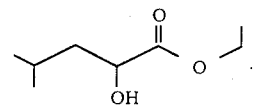

EXAMPLE III

To GOYA ® Guava Jelly (manufactured by the Goya Foods Inc., Secausus, N.J. 07094) containing:
Guava fruit
Guava juice
Sugar
Corn syrup
Pectin
Citrus acid
are placed at levels of 6 ppm and 12 ppm the mixtures of carboxylic acid defined according to the structure:

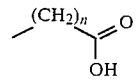

and the ester defined according to the structure:

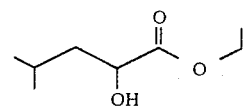

as set forth in Example II, supra, in the proportions set forth in Example II, supra.

The resulting guava jelly has excellent "ripe natural" nuances which render the jelly more aesthetically pleasing to a panel of five members. The panel of five members unanimously prefers the guava jelly containing the mixture of one of the carboxylic acids defined according to the structure:

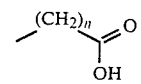

and the ester defined according to the structure:

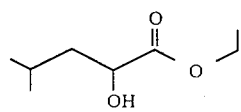

over the guava jelly without the carboxylic acid having the structure:

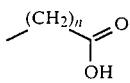

and the ester having the structure:

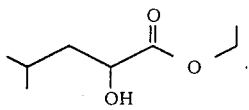

EXAMPLE IV

Isolation of ethyl α-hydroxy isocaproate from caju

Approximately 10 gallons of caju puree (ex. Brazil) is stored at −5° C. until used. A sample is subjected to head space analysis and the following components are identified in the head space:

TABLE I

| COMPONENT | PERCENT (BY PEAK AREA NORMALIZATION) |
| --- | --- |
| Ethyl isovalerate | 46.2 |
| Ethyl hexanoate | 9.3 |
| Limonene | 6.3 |
| Ethyl butyrate | 4.5 |
| Trans-β-ocimene | 4.1 |
| Ethyl tiglate | 3.3 |
| Styrene | 2.3 |
| Ethyl methacrylate | 2.1 |
| n-Amyl alcohol | 2.1 |
| Ethyl propionate | 1.9 |
| Amyl valerate | 1.5 |
| n-Octane | 1.4 |
| $\Delta^3$-Carene | 1.4 |
| α-Pinene | 1.3 |
| Methyl isovalerate | 1.0 |
| Ethyl is hexanoate | 0.9 |
| Ethanol | 0.7 |
| Ethyl octanoate | 0.6 |
| Ethyl valerate | 0.6 |
| Acetoin | 0.6 |
| Toluene | 0.6 |
| Isoamyl acetate | 0.4 |
| Methyl tiglate | 0.2 |
| Ethyl cis-3-hexenoate | 0.2 |
| p-cymene | 0.1 |
| Ethyl benzoate | 0.1 |
| Diethyl phthalate | 0.1 |
| Ethyl isobutyrate | 0.1 |
| 1-Penten-3-ol | 0.1 |
| Total | 94.1 |

The GLC profile of the head space is set forth in FIG. 3. The peak indicated by reference numeral 301 is the peak for ethanol. The peak indicated by reference numeral 302 is the peak for 1-penten-3-ol. The peak indicated by reference numeral 303 is the peak for acetoin. The peak indicated by reference numeral 303A is the peak for ethyl propionate. The peak indicated by reference numeral 304 is the peak for n-amyl alcohol. The peak indicated by reference numeral 305 is the peak for ethyl butyrate. The peak indicated by reference numeral 306 is the peak for toluene. The peak indicated by reference numeral 307 is the peak for methyl isovalerate. The peak indicated by reference numeral 308 is the peak for ethyl butyrate. The peak indicated by reference numeral 309 is the peak for n-octane. The peak indicated by reference numeral 310 is the peak for ethyl methacrylate. The peak indicated by reference numeral 311 is the peak for ethyl isovalerate. The peak indicated by reference numeral 312 is the peak for methyl tiglate. The peak indicated by reference numeral 313 is the peak for isoamyl acetate. The peak indicated by reference numeral 314 is the peak for styrene. The peak indicated by reference numeral 314A is the peak for ethyl valerate. The peak indicated by reference numeral 315 is the peak for ethyl tiglate. The peak indicated by reference numeral 316 is the peak for α-pinene. The peak indicated by reference numeral 317 is the peak for ethyl isohexanoate. The peak indicated by reference numeral 318 is the peak for ethyl hexanoate. The peak indicated by reference 319 is the peak for $\Delta^3$-Carene. The peak indicated by reference numeral 320 is the peak for p-cymene. The peak indicated by reference numeral 321 is the peak for ethyl-cis-3-hexenoate. The peak indicated by reference numeral 322 is the peak for limonene. The peak indicated by reference numeral 323 is the peak for butyl isovalerate. The peak indicated by reference numeral 324 is the peak for trans-β-Ocimene. The peak indicated by reference numeral 325 is the peak for amyl valerate. The peak indicated by reference numeral 326 is the peak for ethyl benzoate. The peak indicated by reference numeral 327 is the peak for ethyl octanoate.

Two gallons of the resulting puree are then subjected to vacuum steam distillation using the apparatus of FIG. 11. The conditions of the distillation are as follows: Pot temperature—23°-33° C. at a vacuum of 1.3-2.0 mm/Hg. Three fractions of approximately 500 ml each (designated "Fraction 1", "Fraction 2" and "Fraction 3") are collected in a wet ice chilled receiver 124 and two traps (designated "trap 1" and "trap 2") collected in traps 134 (for "trap 1") and trap 131 (for "trap 2") cooled with dry ice-isopropyl alcohol are also collected. Each fraction and trap is evaluated for its organoleptic properties. Although all fractions are considered to be "very caju-like" and are valued for the purpose of analyses, Fraction 1, collected in receiver 124 is considered to be the best and most representative of the aroma nuances. Each of Fractions 1, 2 and 3 and traps 1 and 2 are treated separately. Each is extracted twice with Fereon-11 and then dried and concentrated and analyzed using GLC and MS analyses (except for Fraction 2 which yielded insufficient material for analysis). The weights of the recovered oils are set forth as follows:

| FRACTION | WEIGHT |
| --- | --- |
| 1 (collected in receiver 124) | 15.1 mg |
| 2 (collected in receiver 124) | negligible |
| 3 (collected in receiver 124) | 9.0 mg |
| TRAP | |
| 1 (collected in trap 134) | 24.3 mg |
| 2 (collected in trap 131) | 6.7 mg |
| TOTAL | 55.1 mg |

A description of the apparatus of FIG. 11 is as follows: Flask 111 is a 5 liter 3 neck flask (end joints 29/42; middle joints 45/50) which is used for steam generation. The steam is generated through line 115 through claisen adaptor 113/118/119 using water trap 117 (which acts as a trap for condensed steam and for a pot material in the event of back siphoning from flask 128). Thermometer 114 measures the temperature of the steam being generated. Vacuum control adaptor 112 is fitted on to flask 111 because the vacuum must be relieved from a point before the pot to prevent back siphoning.

The steam passes through line 116 into flask 128, a 22 liter 3 neck flask with 45/50 joints which is charged with the caju puree (ex. Brazil) (2 gallons). Flask 128 is fitted with thermometer 120. The steam distillation is carried out by passing steam into the caju puree in flask 128 via sparger 116A which is an extension of tube 116. Flask 128 is fitted with thermometer 120 and distillation head 121A and adaptor 121. The distillation head is fitted with thermometer 122. The steam distillate is condensed in condensor 123 while vacuum source at 130 is in operation. The material caused to condense as a result of the water cooling of condenser 123 and the vapor passes through fraction cutter 125. The three fractions (Fraction 1, Fraction 2 and Fraction 3) approximately 500 ml each are collected in ice cooled flask 124 while the two traps are collected in the dry ice/isopropenol cooled traps 134 (for trap 1) and 131 (for trap 2). The dry ice/isopropyl alcohol cooling bath for trap 134 is indicated by reference numeral 133. The dry ice/isopropyl alcohol cooling bath for trap 131 is indicated by reference numeral 132. The gases to be trapped in traps 131 and 134 pass through lines 126 and 127. The material to be trapped in trap 131 passes through line 129.

FIG. 4 is the GLC profile for fraction 1 collected in receiver 124.

The peak indicated by reference numeral 401 is the peak for the solvent. The peak indicated by reference numeral 402 is the peak for acetic acid. The peak indicated by reference numeral 403 is the peak for ethyl acetate. The peak indicated by reference numeral 403A is the peak for acetoin. The peak indicated by reference numeral 404 is the peak for isoamyl alcohol. The peak indicated by reference numeral 405 is the peak for n-amyl alcohol. The peak indicated by reference numeral 406 is the peak for toluene. The peak indicated by reference numeral 407 is the peak for ethyl butyrate. The peak indicated by reference numeral 408 is the peak for 3-methyl-1-pentenol. The peak indicated by reference numeral 408A is the peak for ethyl methacrylate. The peak indicated by reference numeral 409 is the peak for cis-3-hexenol. The peak indicated by reference numeral 410 is the peak for n-hexanol. The peak indicated by reference numeral 411 is the peak for 2-methyl butyric acid. The peak indicated by reference numeral 412 is the peak for ethyl tiglate. The peak indicated by reference numeral 414 is the peak for ethyl α-hydroxy isocaproate having the structure:

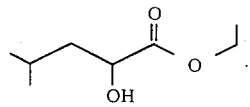

The peak indicated by reference numeral 413 is the peak for n-octanol. The peak indicated by reference numeral 415 is the peak for ethyl α-hydroxy isoheptanoate.

The peak indicated by reference numeral 416 is the peak for phenyl ethyl alcohol. The peak indicated by reference numeral 417 is the peak for 4-acetyl-1-methyl-1-cyclohexene (a possible artifact). The peak indicated by reference numeral 418 is the peak for methylthio-2-furoate.

The peak indicated by reference numeral 419 is the peak for ethyl α-hydroxy isooctanoate. The peak indicated by reference numeral 420 is the peak for butyl tiglate. The peak indicated by reference numeral 421 is the peak for ethyl benzoate. The peak indicated by reference numeral 422 is the peak for dimethyl anisole. The peak indicated by reference numeral 423 is the peak for δ-decalactone. The peak indicated by reference numeral 424 is the peak for ethyl cinnamate. The peak indicated by reference numeral 425 is the peak for δ-undecalactone.

The percentage of quantities in Fraction 1 as determined by GLC is indicated in Table II:

TABLE II

ANALYSIS OF FRACTION 1 FROM CAJU VACUUM STEAM DISTILLATION

| COMPONENT | PERCENT (BY PEAK AREA NORMALIZATION) |
|---|---|
| Ethyl α-hydroxy isocaproate | 46.7 |
| Isoamyl alcohol | 11.3 |
| Cis-3-hexenol | 4.6 |
| 4-Acetyl-1-methyl-1-cyclohexene (possible artifact) | 2.8 |
| Ethyl cinnamate | 2.1 |
| n-hexanol | 2.0 |
| n-amyl alcohol | 0.7 |
| Toluene | 0.7 |
| Ethyl tiglate | 0.7 |
| Acetoin | 0.7 |
| δ-Undecalactone | 1.3 |
| 2-Methyl butyric acid | 0.6 |
| Ethyl butyrate | 0.4 |
| Ethyl α-hydroxy isoheptanoate | 0.4 |
| Phenyl ethyl alcohol | 0.4 |
| Acetic acid | 0.2 |
| Ethyl acetate | 0.2 |
| Ethyl methacrylate | 0.2 |
| 4-Methyl-1-pentanol | 0.2 |
| n-octanol | 0.2 |
| Dimethyl anisole (isomer unknown) | 0.2 |
| δ-decalactone | 0.1 |
| Methylthio-2-furoate | 0.1 |
| Ethyl α-hydroxy isooctanoate | 0.1 |
| Butyl tiglate | 0.1 |
| Ethyl benzoate | 0.1 |
| TOTAL | 77.2 |

FIG. 5 is the GLC profile for Fraction 3 of the caju vacuum steam distillation collected in receiver 124.

The peak indicated by reference numeral 501 is the peak for solvent. The peak indicated by reference numeral 502 is the peak for acetic acid. The peak indicated by reference numeral 503 is the peak for cis-3-hexenol. The peak indicated by reference numeral 504 is the peak for 2-methyl butyric acid. The peak indicated by reference numeral 505 is the peak for ethyl α-hydroxy isovalerate. The peak indicated by reference numeral 506 is the peak for benzyl alcohol. The peak indicated by reference numeral 514 is the peak for ethyl α-hydroxy isocaproate. The peak indicated by reference numeral 507 is the peak for ethyl α-hydroxy isoheptanoate. The peak indicated by reference numeral 508 is the peak for phenyl ethyl alcohol. The peak indicated by reference numeral 509 is the peak for 4-acetyl-1-methyl-cyclohexene. The peak indicated by reference numeral 510 is the peak for benzoic acid. The peak indicated by reference numeral 511 is the peak for δ-nonalactone. The peak indicated by reference numeral 512 is the peak for δ-decalactone. The peak indicated by reference numeral 513 is the peak for ethyl cinnamate. The peak indicated by reference numeral 515 is the peak for δ-undecalactone.

Table III sets forth the GLC analysis of Fraction 3 of the caju vacuum steam distillation product collected in receiver 124:

TABLE III

ANALYSIS OF FRACTION 3 OF THE CAJU VACUUM STEAM DISTILLATION

| COMPONENT | PERCENT (BY PEAK AREA NORMALIZATION) |
|---|---|
| Benzoic acid | 95.62 |
| Ethyl α-hydroxy isocaproate | 1.96 |
| Cis-3-hexenol | .82 |
| 2-Methyl butyric acid | .51 |
| Acetic acid | .14 |
| Ethyl α-hydroxy isovalerate | .03 |
| Benzyl alcohol | .03 |
| Ethyl α-hydroxy isoheptanoate | .03 |
| Phenyl ethyl alcohol | .03 |
| 4-Acetyl-1-methyl-1-cyclohexene (possible artifact) | .03 |
| δ-Nonalactone | .03 |
| δ-Decalactone | .03 |
| Ethyl cinnamate | .03 |
| δ-Undecalactone | .03 |
| TOTAL | 99.32 |

FIG. 6 is the GLC profile for trap 1 of the caju vacuum steam distillation collected in trap 134.

The peak indicated by reference numeral 601 is the peak for isoamyl alcohol. The peak indicated by reference numeral 602 is the peak for cis-3-hexen-1-ol. The peak indicated by reference numeral 603 is the peak for n-hexenol. The peak indicated by reference numeral 604 is the peak for ethyl tiglate. The peak indicated by reference numeral 605 is the peak for n-heptanol. The peak indicated by reference numeral 606 is the peak for ethyl α-hydroxy isovalerate. The peak indicated by reference numeral 607 is the peak for ethyl hexanoate. The peak indicated by reference numeral 608 is the peak for 2-ethyl hexanol. The peak indicated by reference numeral 614 is the peak for ethyl α-hydroxy isocaproate having the structure:

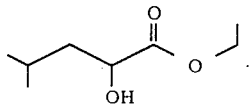

The peak indicated by reference numeral 609 is the peak for n-octanol. The peak indicated by reference numeral 610 is the peak for ethyl α-hydroxy isoheptanoate. The peak indicated by reference numeral 611 is the peak for isoamyl isovalerate. The peak indicated by reference numeral 612 is the peak for 4-acetyl-1-methyl-1-cyclohexene. The peak indicated by reference numeral 613 is the peak for ethyl α-hydroxy isooctanoate. The peak indicated by reference numeral 615 is the peak for butyl tiglate. The peak indicated by reference numeral 616 is the peak for ethyl benzoate. The peak indicated by reference numeral 616A is the peak for n-nonanol. The peak indicated by reference numeral 617 is the peak for ethyl octanoate. The peak indicated by reference numeral 618 is the peak for benzothiazole. The peak indicated by reference numeral 619 is the peak for ethyl phenyl acetate. The indicated by reference numeral 620 is the peak for cis-3-hexenyl-2-methyl butyrate. The peak indicated by reference numeral 621 is the peak for amyl hexanoate. The peak indicated by reference numeral 622 is the peak for t-butyl cresol. The peak indicated by reference numeral 623 is the peak for diphenyl ether. The peak indicated by reference numeral 624 is the peak for calamenene. The peak indicated by reference numeral 625 is the peak for ethyl cinnamate. The peak indicated by reference numeral 626 is the peak for ionol. The peak indicated by reference numeral 627 is the peak for n-pentadecane. The peak indicated by reference numeral 628 is the peak for n-hexadecane. The peak indicated by reference numeral 629 is the peak for n-heptadecane. The peak indicated by reference numeral 630 is the peak for n-octadecane. The peak indicated by reference numeral 631 is the peak for n-nonadecane.

Table IV sets for the analysis of trap 1 from the caju vacuum steam distillation, recovered in trap 134:

TABLE IV

ANALYSIS OF TRAP 1 FROM CAJU VACUUM STEAM DISTILLATION

| COMPONENT | PERCENT (BY PEAK AREA NORMALIZATION) |
|---|---|
| Ionol | 27.50 |
| Ethyl α-hydroxy isocaproate | 17.60 |
| Diphenyl ether | 6.80 |
| n-Heptadecane | 4.20 |
| n-Hexadecane | 4.00 |
| n-Pentadecane | 3.20 |
| n-Octadecane | 2.20 |
| Benzothiazole | 2.00 |
| n-Octanol | 1.40 |
| Calamenene | 1.00 |
| n-Nonadecane | 0.80 |
| Ethyl cinnamate | 0.70 |
| Ethyl octanoate | 0.45 |
| Ethyl benzoate | 0.38 |
| t-Butyl cresol | 0.29 |
| Cis-3-hexenyl-2-methyl butyrate | 0.20 |
| (Iso)amyl isovalerate | 0.18 |
| Cis-3-hexen-1-ol | 0.10 |
| Ethyl hexanoate | 0.06 |
| n-Amyl hexanoate | 0.05 |
| n-Nonanol | 0.04 |
| Myrcene | 0.03 |
| Isoamyl alcohol | 0.03 |
| Ethyl α-hydroxy isovalerate | 0.03 |
| 4-Acetyl-1-methyl-1-cyclohexene (possible artifact) | 0.03 |
| Acetophenone | 0.02 |
| Ethyl phenyl acetate | 0.02 |
| Butyl tiglate | 0.02 |
| n-Hexanol | 0.01 |
| Ethyl tiglate | 0.01 |
| 2-Ethyl hexanol | 0.01 |
| n-Heptanol | 0.01 |
| Ethyl α-hydroxy isoheptanoate | 0.01 |
| Ethyl α-hydroxy isooctanoate | 0.01 |
| TOTAL | 73.40 |

FIG. 7 is the GLC profile for trap 2 of the caju vacuum steam distillation product recovered in trap 131.

The peak indicated by reference numeral 701 is the peak for the solvent. The peak indicated by reference numeral 702 is the peak for a mixture of isobutanol and methyl isobutyrate and butyric acid. The peak indicated by reference numeral 702A is the peak for n-butanol. The peak indicated by reference numeral 703 is the peak for 1-octen-3-ol. The peak indicated by reference numeral 703A is the peak for acetoin. The peak indicated by reference numeral 704 is the peak for isoamyl alcohol.

The peak indicated by reference numeral 705 is the peak for a mixture of n-amyl alcohol; cis-2-pentenol; toluene; cis-3-hexenal; furfural; n-hexanal; and 3-methyl-1-pentanol. The peak indicated by reference numeral 706 is the peak for cis-3-hexenol; the peak indicated by reference numeral 707 is the peak for 2-methyl butyric acid. The peak indicated by reference numeral 708 is the peak for ethyl tiglate. The peak indicated by reference numeral 709 is the peak for the mixture of benzaldehyde and ethyl isocaproate. The peak indicated by reference numeral 710 is the peak for ethyl α-hydroxy isovalerate. The peak indicated by reference numeral 711 is the peak for ethyl hexanoate. The peak indicated by reference numeral 712 is the peak for the mixture of 1,8-cineole and limonene. The peak indicated by reference numeral 713 is the peak for acetophenone. The peak indicated by reference numeral 714 is the peak for ethyl α-hydroxy isocaproate having the structure:

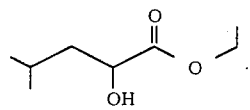

The peak indicated by reference numeral 714A is the peak for the mixture of p-cresol and n-octanol. The peak indicated by reference numeral 715 is the peak for ethyl α-hydroxy isoheptanoate. The peak indicated by reference numeral 716 is the peak for trans-2-nonenol. The peak indicated by reference numeral 717 is the peak for amyl valerate. The peak indicated by reference numeral 718 is the peak for 4-acetyl-1-methyl-cyclohexene (a possible artifact). The peak indicated by reference numeral 719 is the peak for ethyl benzoate. The peak indicated by reference numeral 720 is the peak for ethyl octanoate. The peak indicated by reference numeral 721 is the peak for benzothiazole. The peak indicated by reference numeral 722 is the peak for methyl naphthalene. The peak indicated by reference numeral 723 is the peak for n-tridecane. The peak indicated by reference numeral 724 is the peak for δ-nonalactone. The peak indicated reference numeral 725 is the peak for t-butyl-m-cresol. The peak indicated by reference numeral 726 is the peak for diphenyl ether. The peak indicated by reference numeral 727 is the peak for n-tetradecane. The peak indicated by reference numeral 728 is the peak for β-caryophyllene. The peak indicated by reference numeral 729 is the peak of calamenene. The peak indicated by reference numeral 730 is the peak for ethyl cinnamate. The peak indicated by reference numeral 731 is the peak for n-pentadecane. The peak indicated by reference numeral 732 is the peak for ionol. The peak indicated by reference numeral 733 is the peak for n-hexadecane. The peak indicated by reference numeral 734 is the peak for 2-methylthio-benzothiazole. The peak indicated by reference numeral 735 is the peak for n-heptadecane. The peak indicated by reference numeral 736 is for n-octadedane. The peak indicated by reference numeral 737 is the peak for n-nonadecane.

FIG. 8 is the GCMS profile for fraction 1 of the steam distillate in receiver 124.

FIG. 9 is the infra-red spectrum for peak 414 of fraction 1 of the steam distillate of Example IV received in receiver 124 having the structure:

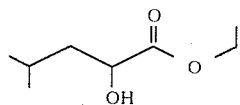

FIG. 10 is the NMR spectrum for peak 414 of fraction 1 of the steam distillate of Example IV received in receiver 124 having the structure:

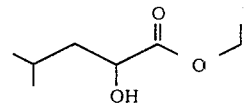

(Conditions: Field strength: 100 MHz; solvent: CFCl$_3$).

What is claimed is:
1. A process for augmenting or enhancing the aroma or taste of a tropical flavored foodstuff selected from the group consisting of guava flavored foodstuff, mango flavored foodstuff and papaya flavored foodstuff comprising the step of adding to said tropical flavored foodstuff from 0.5 parts per million up to about 500 parts per million based on the total foodstuff of a mixture of:
(a) at least one carboxylic acid defined according to the structure:

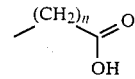

and
(b) the synthetically produced substantially pure ethyl ester of 2-hydroxy-4-methyl pentanoic acid having the structure

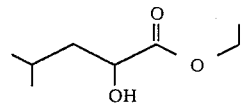

wherein the weight ratio of ethyl ester of 2-hydroxy-4-methyl pentanoic acid: carboxylic acid is from about 8:1 to about 2:1.
2. The process of claim 1 wherein the carboxylic acid is n-butyric acid.
3. The process of claim 1 wherein the carboxylic acid us n-hexanoic acid.
4. The process of claim 1 wherein the carboxylic acid is n-decanoic acid.
5. The process of claim 1 wherein the carboxylic acid is n-octanoic acid.
6. The process of claim 1 wherein the tropical flavored foodstuff is a guava flavored foodstuff.
7. The process of claim 1 wherein the tropical flavored foodstuff is a mango flavored foodstuff.
8. The process of claim 1 wherein the tropical flavored foodstuff is a papaya flavored foodstuff.

* * * * *

UNITED STATES PATENT AND TRADEMARK OFFICE
CERTIFICATE OF CORRECTION

PATENT NO. : 4,499,114
DATED : February 12, 1985
INVENTOR(S) : Domenick Luccarelli, Jr.; Braja D. Mookherjee; Richard A. Wilson; Michael J. Zampino and David R. Bowen It is certified that error appears in the above-identified patent and that said Letters Patent are hereby corrected as shown below:

Column 22, line 33, after the structure, add:

---(wherein n represents an even integer of 2, 4, 6 or 8);---

Signed and Sealed this

Twelfth Day of April, 1988

Attest:

DONALD J. QUIGG

Attesting Officer    Commissioner of Patents and Trademarks